US009449042B1

(12) United States Patent
Evans et al.

(10) Patent No.: US 9,449,042 B1
(45) Date of Patent: Sep. 20, 2016

(54) RECOMMENDING IMPROVEMENTS TO AND DETECTING DEFECTS WITHIN APPLICATIONS

(71) Applicant: Amazon Technologies, Inc., Reno, NV (US)

(72) Inventors: Ethan Zane Evans, Snoqualmie, WA (US); Christopher Lawrence Lavin, Seattle, WA (US); Ernist Robert Ramirez, Lake Forest, CA (US); David Allen Markley, Bellevue, WA (US); Miguel Azancot Roque, Seattle, WA (US); Aaron Curtis Rubenson, Seattle, WA (US); Michael Anthony Frazzini, Seattle, WA (US); Mekka Chibuisi Okereke, Irvine, CA (US); Ameesh Paleja, Irvine, CA (US); Antonio Bianco, Laguna Niguel, CA (US); James Newton Adkins, III, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 13/926,234

(22) Filed: Jun. 25, 2013

(51) Int. Cl.
*G06F 17/30* (2006.01)
(52) U.S. Cl.
CPC ............... *G06F 17/30386* (2013.01)
(58) Field of Classification Search
CPC ................................. G06F 17/30386
USPC .................................. 707/758, 736
See application file for complete search history.

(56) References Cited

U.S. PATENT DOCUMENTS

| 7,266,702 | B2 * | 9/2007 | Hotti ............................ 713/186 |
| 7,318,092 | B2 * | 1/2008 | Sutler .................... G06Q 30/02 |
| | | | 709/223 |
| 7,523,191 | B1 * | 4/2009 | Thomas et al. ............... 709/224 |
| 8,051,298 | B1 * | 11/2011 | Burr et al. ..................... 713/187 |
| 2005/0171961 | A1 * | 8/2005 | Culbreth et al. ............. 707/100 |
| 2007/0136207 | A1 * | 6/2007 | Davydov et al. ............... 705/57 |
| 2009/0044177 | A1 * | 2/2009 | Bates ........................ G06F 8/75 |
| | | | 717/131 |
| 2009/0089869 | A1 * | 4/2009 | Varghese .......................... 726/7 |
| 2012/0210423 | A1 * | 8/2012 | Friedrichs et al. ............. 726/22 |
| 2012/0240236 | A1 * | 9/2012 | Wyatt et al. .................... 726/25 |
| 2013/0046965 | A1 * | 2/2013 | Vin et al. ......................... 713/1 |
| 2013/0055367 | A1 * | 2/2013 | Kshirsagar et al. ............. 726/6 |
| 2013/0133033 | A1 * | 5/2013 | Davis et al. ...................... 726/3 |
| 2014/0156877 | A1 * | 6/2014 | Tylik et al. ..................... 710/18 |

OTHER PUBLICATIONS

Ami, Parvin, et al., "Seven Phrase Penetration Testing Model", International Journal of Computer Applications, vol. 59, No. 5, Dec. 2012, pp. 16-20.*

(Continued)

*Primary Examiner* — Robert Stevens
(74) *Attorney, Agent, or Firm* — Thomas | Horstemeyer, LLP

(57) ABSTRACT

In various embodiments, static, dynamic, and behavioral analyzes may be performed on an application. A set of software libraries employed by the application may be determined. A set of device resources employed by the application may be determined. An application fingerprint is generated for the application. The application fingerprint encodes identifiers for the set of software libraries and identifiers for the set of device resources. Improvements can be recommended based upon an analysis of the application fingerprint.

24 Claims, 5 Drawing Sheets

(56) References Cited

OTHER PUBLICATIONS

Xiong, Pulei, et al., "Model-Based Penetration Test Framework for Web Applications Using TTCN-3", MCETECH 2009, LNBIP 26, Springer-Verlag Berlin, Germany, © 2009, pp. 141-154.*
Chun, Byung-Gon, et al., "CloneCloud: Elastic Execution between Mobile Device and Cloud", EuroSys '11, Salzburg, Austria, Apr. 10-13, 2011, pp. 301-314.*
U.S. Appl. No. 13/926,574, filed Jun. 25, 2013 and entitled "Application Recommendations based on application and lifestyle fingerprinting", Jul. 3, 2013.
U.S. Appl. No. 13/926,211, filed Jun. 25, 2013 and entitled "Analyzing Security of Applications", Jul. 3, 2013.
U.S. Appl. No. 13/926,607, filed Jun. 25, 2013 and entitled "Application Fingerprinting", Jul. 3, 2013.
U.S. Appl. No. 13/926,656, filed Jun. 25, 2013 and entitled "Application Monetization Based on Application and Lifestyle Fingerprinting", Jul. 3, 2013.
U.S. Appl. No. 13/926,683, filed Jun. 25, 2013 and entitled "Developing Versions of Applications Based on Application Fingerprinting", Jul. 3, 2013.
U.S. Appl. No. 13/926,215, filed Jun. 25, 2013 and entitled "Identifying Relationships Between Applications", Jul. 3, 2013.
U.S. Appl. No. 13/215,972, filed Aug. 23, 2011 and entitled "Collecting Application Usage Metrics", Jul. 3, 2013.
U.S. Appl. No. 13/555,724, filed Jul. 23, 2012 and entitled "Behavior-Based Identity System", Jul. 3, 2013.

* cited by examiner

RECOMMENDING IMPROVEMENTS TO AND DETECTING DEFECTS WITHIN APPLICATIONS

BACKGROUND

An application marketplace may offer a multitude of different applications, such as mobile applications. For example, the applications may include games, email applications, social networking applications, mapping applications, imaging applications, music playing applications, shopping applications, and so on. Various applications offered by various developers may fiercely compete for sales, advertising revenue, market share, etc. Developers are often seeking ways to improve their offerings to broaden the appeal of an application, improve sales, etc. Some applications may have defects that result in crashes, poor rendering performance, high resource consumption, and/or other problems, which developers may wish to address to improve the performance of an application in the marketplace.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating profiles of applications, referred to herein as application fingerprinting. An application fingerprint uniquely identifies an application based on, for example, what application programming interfaces (API) it uses, what software libraries or code fragments it uses, what hardware devices it accesses, what device resources it employs, typical resource consumption patterns, and/or other characteristics. In some embodiments, the application fingerprint may also identify typical user behavior relative to the application. The application fingerprints may have many uses, including application search, application categorization, defect detection, and so on. Accordingly, in an application marketplace, the application fingerprint of many applications that are potentially related to one another in some way can be generated. Additionally, recommendations for improvements to application are generated based at least in part upon an analysis of the application fingerprints of applications that are related to one another as well as usage data associated with these applications.

The present disclosure also relates to detecting and correcting defects in applications through the use of profiles of applications, referred to herein as application fingerprinting. An application fingerprint uniquely identifies an application based on, for example, what application programming interfaces (API) it uses, what software libraries it uses, what hardware devices it accesses, typical resource consumption patterns, and/or other characteristics. In some embodiments, the application fingerprint may also identify typical user behavior relative to the application. The application fingerprints may have many uses, including application search, application categorization, defect detection, and so on.

Figure 1:
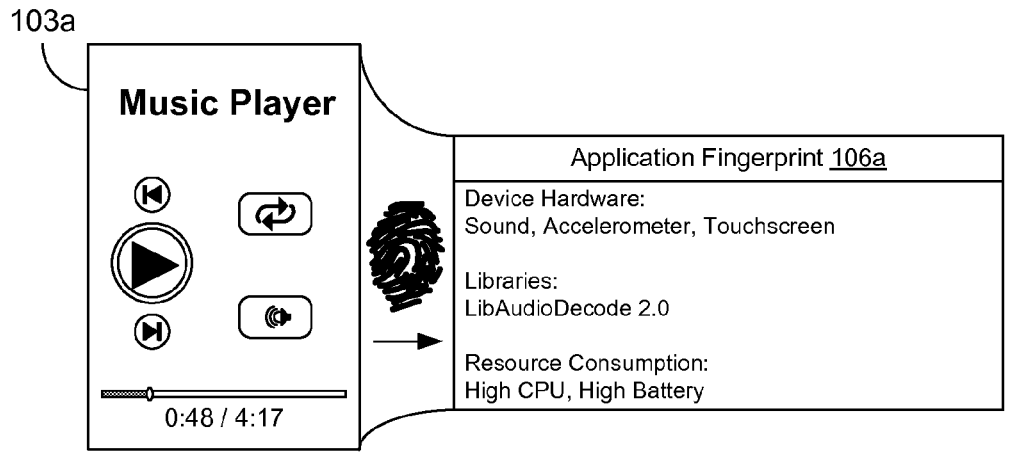
FIG. 1 is a drawing of an exemplary application fingerprint scenario according to various embodiments of the present disclosure.
Figure 1:
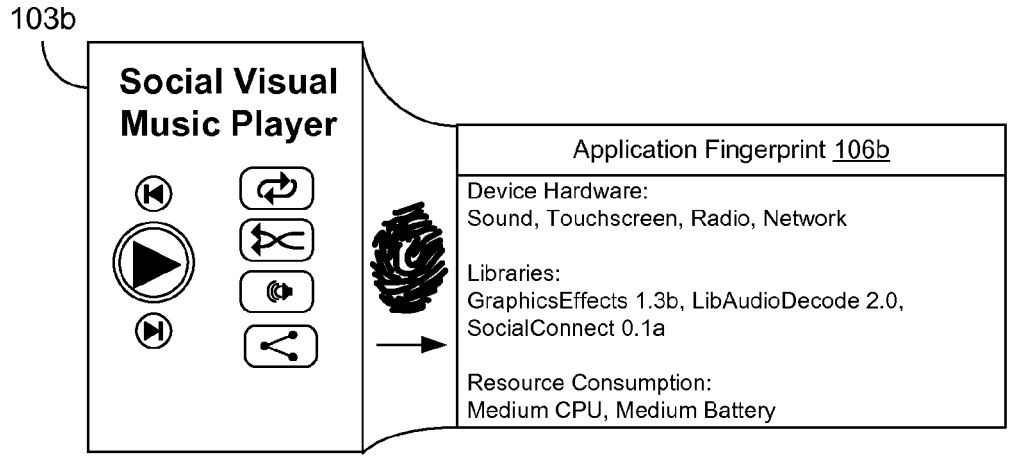

With reference to FIG. 1, illustrated is an application fingerprinting scenario 100. More specifically, the application fingerprinting scenario 100 illustrates two applications 103a and 103b, for which corresponding application fingerprints 106a and 106b have been generated. The applications 103 are representative of the multitude of applications 103 that may be offered by an application marketplace. In this non-limiting example, the application 103a corresponds to a music player and the application 103b corresponds to another music player that may have varying and/or additional features relative to the application 103a. Each of the applications 103 has its own respective application fingerprint 106 that can function to distinguish one application 103 from another and/or to identify similarities between applications 103. Accordingly, in the non-limiting example of FIG. 1, each of the application fingerprints 106 identifies characteristics relating to device hardware used, software libraries or code fragments used, and resource consumption. In other examples, additional or different characteristics may be represented by the application fingerprints 106. Here, the application fingerprint 106a indicates that the application 103a uses the accelerometer and touchscreen of the device and the software libraries or recognizable code fragments named "Graphics Effects 1.3b" and "LibAudioDecode 2.0." Also, the application 103a is associated with high processor and battery usage. The application fingerprint 106b indicates that the application 103b uses a sound device, the touchscreen of the device as well as radio and network capabilities of the device. The application fingerprint 106b also indicates that the application 103b uses the software libraries named "GraphicsEffects 1.3b," and "LibAudioDecode 2.0," and "SocialConnect 0.1a." The application 103b is associated with medium processor and battery usage.

Accordingly, embodiments of the disclosure can generate a recommendation associated with an application that identifies one or more features that may be added to the application to improve the performance of the application with respect to various performance metrics. Such a recommendation can be generated by identifying other applications that may share a common feature and/or capability based at least in part upon an analysis of respective application fingerprints 106 of the application and identifying features and/or capabilities of the other applications that can be incorporated into the application. In the following discussion, a general description of the system and its components is provided, followed by a discussion of the operation of the same.

Figure 2:
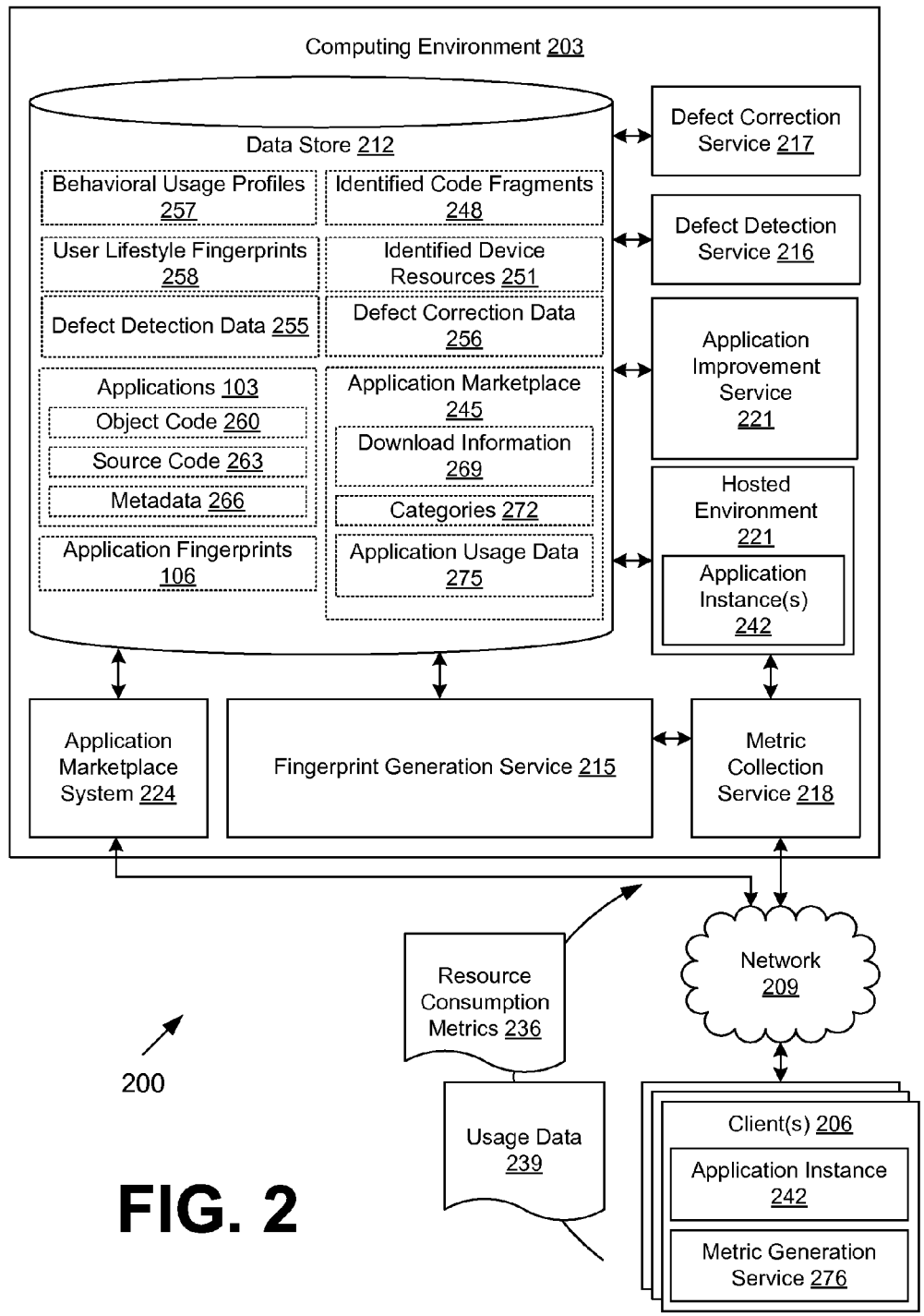
FIG. 2 is a drawing of a networked environment according to various embodiments of the present disclosure.

Turning now to FIG. 2, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a fingerprint generation service 215, a defect detection service 216, a defect correction service 217, a metric collection service 218, a hosted environment 220, an application improvement service 221, an application marketplace system 224, and other applications, services, processes, systems, engines, or functionality not discussed in detail herein. The fingerprint generation service 215 is executed to generate application fingerprints 106 for applications 103.

Various techniques relating to application fingerprinting are described in U.S. Patent Application entitled "APPLICATION FINGERPRINTING" filed Jun. 25, 2013 under Ser. No. 13/926,607; U.S. Patent Application entitled "APPLICATION MONETIZATION BASED ON APPLICATION AND LIFESTYLE FINGERPRINTING" filed Jun. 25, 2013 under Ser. No. 13/926,656; U.S. Patent Application entitled "DEVELOPING VERSIONS OF APPLICATIONS BASED ON APPLICATION FINGERPRINTING" filed Jun. 25, 2013 under Ser. No. 13/926,683; U.S. Patent Application entitled "APPLICATION RECOMMENDATIONS BASED ON APPLICATION AND LIFESTYLE FINGERPRINTING" filed Jun. 25, 2013 under Ser. No. 13/926,574; U.S. Patent Application entitled "IDENTIFYING RELATIONSHIPS BETWEEN APPLICATIONS" filed Jun. 25, 2013 under Ser. No. 13/926,215; and U.S. Patent Application entitled "ANALYZING SECURITY OF APPLICATIONS" filed Jun. 25, 2013 under Ser. No. 13/926,211; all of which are incorporated herein by reference in their entirety.

The defect detection service 216 is executed to detect defects in applications 103. Such defects may correspond to defects within the code of the application 103 itself or defects within software libraries that are included by or otherwise used by the application 103. Such defects may include memory leaks, infinite loops, malware, viruses, and/or other misuses of client 206 resources or security vulnerabilities.

In one example, the defect detection service 216 may detect defects associated with an application 103 based at least in part on external reports of the defects. In another example, the defect detection service 216 may detect defects as part of the application fingerprint 106 generation process, namely during the course of static analysis, dynamic analysis, or behavior analysis. The defect detection service 216 may determine that multiple applications 103 include the defect based at least in part on the application fingerprints 106, where applications 103 that are similar to a known defective application 103 may be ascertained. The defect detection service 216 may send a notification of the defect to a party associated with the application 103 and/or initiate an automated correction of the defect via the defect correction service 217.

The defect correction service 217 is employed to correct defects that have been identified for an application 103. To this end, the defect correction service 217 may patch code associated with the application 103 to resolve defective code within the application 103. In some cases, the defect correction service 217 may replace a defective software library employed by the application 103 with an alternative software library that does not include the defect.

The metric collection service 218 is executed to obtain various metrics as for use by the fingerprint generation service 215 in generating application fingerprints 106. Such metrics may include resource consumption metrics 236, usage data, and/or other types of metrics. Additionally, the metric collection service 218 can also obtain usage data 239 associated with a particular application 103 by users of the application marketplace 245 who have installed the application 103. Such usage data 239 can include crash data, or information related to the unexpected termination of an application 103. Usage data 239 can also comprise information about various aspects, features, levels of an application 103 that users of the application marketplace 245 utilize during usage of the application 103. For example, the usage data 239 can include usage time of a user within different levels of a game application, the amount of time a user spends in a particular section of an application relative to other applications, or an amount of network traffic originating from the application. Usage data 239 can also include an amount of usage time within a particular difficulty setting of an application, various maps or worlds of a game application, or any other usage metric associated with an application 103, or any other usage metric associated with an application 103.

The hosted environment 220 is configured to execute an application instance 242 for use in dynamic analysis and resource consumption profiling by the fingerprint generation service 215. To this end, the hosted environment 220 may comprise an emulator or other virtualized environment for executing the application instance 242.

In one embodiment, an application 103 can be instrumented to report usage data 239 to the metric collection service 218. The usage data 239 and/or resource consumption metrics 236 can be stored in the data store 212 and associated with a user account of a user. In other embodiments, the metric collection service 218 is configured to store the usage data 239 and/or resource consumption metrics 236 on an aggregate, non-user identifiable basis. In either scenario, the stored data can be analyzed with respect to various attributes of users, such as demographic categories.

The application marketplace system 224 is executed to provide functionality relating to an application marketplace 245 in which a multitude of applications 103 may be submitted by developers and made available for purchase and/or download by users. The application marketplace system 224 may include functionality relating to electronic commerce, e.g., shopping cart, ordering, and payment systems. The application marketplace system 224 may support searching and categorization functionality so that users may easily locate applications 103 that are of interest. The application marketplace system 224 may include functionality relating to verification of compatibility of applications 103 with various clients 206.

The data stored in the data store 212 includes, for example, applications 103, application fingerprints 106, identified code fragments 248, identified device resources 251, resource consumption profiles 254, defect detection data 255, defect correction data 256, behavioral usage profiles 257, user lifestyle fingerprints 258, data relating to an application marketplace 245 and potentially other data. The applications 103 correspond to those applications 103 that have been submitted by developers and/or others, for example, for inclusion in the application marketplace 245. The applications 103 may correspond to game applications, email applications, social network applications, mapping applications, and/or any other type of application 103. In one embodiment, the applications 103 correspond to mobile applications 103 for use on mobile devices such as, for example, smartphones, tablets, electronic book readers, and/or other devices.

The identified code fragments 248 correspond to various code libraries and application programming interface (API) calls that are used by various applications 103. Unlike custom code that is specific to an application 103, the identified code fragments 248 include functionality that may be employed and reused by many different applications 103 in either an exact or substantially similar form. As an example, a code fragment 248 may correspond to a software library. As another example, a code fragment 248 may correspond to open-source reference code for performing some function. Each of the identified code fragments 248 may have a corresponding version, and multiple different versions of the software library may be employed by the applications 103. Unique identifiers may be associated with each identified code fragment 248 and/or various API calls within each identified code fragment 248. Some of the identified code fragments 248 may be binary-compatible alternatives to others of the identified code fragments 248. Some of the identified code fragments 248 may be non-binary-compatible alternatives to others of the identified code fragments 248. Various data may be stored indicating how the various code fragments 248 are employed, e.g., to render specific user interface elements, to obtain a specific user gesture, and so on.

The identified device resources 251 correspond to the various hardware and/or software requirements of the applications 103. For example, various applications 103 may require or request access to hardware devices on clients 206 such as accelerometers, touchscreens having a certain resolution/size, GPS devices, network devices, storage devices, and so on. Additionally, various applications 103 may access application resources on clients 206. Such application resources may include sound files, graphical assets, graphical textures, images, buttons, user interface layouts, and so on. Such application resources may include data items on clients 206, e.g., contact lists, text messages, browsing history, etc. Identifiers for such application resources may be included in a generated application fingerprint 106. It is noted that the identified device resources 251 may include static resources and runtime resources.

The resource consumption profiles 254 correspond to profiles of resource consumption for applications 103 that are generated from resource consumption metrics 236 collected by the metric collection service 218. The resource consumption profiles 254 may indicate processor usage, memory usage, battery usage, network usage, and/or other resources that are consumed. The resource consumption profiles 254 may indicate maximum consumption, average consumption, median consumption, minimum consumption, and/or other statistics for a particular application 103.

The defect detection data 255 may include various data that facilitates recognition of defects in applications 103. Such data may include code patterns, signatures, hashes, and so on that indicate defects to facilitate defect recognition via static analysis. As a non-limiting example, the defect detection data 255 may include a code pattern that is associated with buffer overflow vulnerabilities.

The defect detection data 255 may specify resource consumption profiles 254 that may indicate defects via dynamic analysis. As a non-limiting example, the defect detection data 255 may define a threshold for processor usage that may indicate an infinite loop or other misuse of processor resources. As another non-limiting example, the defect detection data 255 may define a threshold for battery usage that may indicate a misuse of hardware resources. The defect detection data 255 may record associations between applications 103 and/or portions of applications 103 with defects. The defect detection data 255 may also record associations between identified code fragments 248 and/or identified device resources 251 and defects.

The defect correction data 256 facilitates correction of defects by the defect correction service 217. To this end, the defect correction data 256 may specify suitable replacement software libraries for defective libraries, code patches to correct defects in object code 260, code patches to correct defects in source code 263, fixes to correct issues with metadata 266, and so on. In one embodiment, portions of the defect correction data 256 may be ascertained automatically from similar applications 103 that do not include the defect. Such similar applications 103 may be determined according to the application fingerprints 106. In another embodiment, external data may be obtained to populate the defect correction data 256. In some cases, the defect correction data 256 may be manually configured.

The behavioral usage profiles 257 correspond to profiles of behavioral usage for applications 103 that are generated from behavioral usage metrics 239 collected by the metric collection service 218. The behavioral usage profiles 257 may indicate average duration that the application instances 242 execute, times of day and/or locations where the application instances 242 are executed, privacy-related behaviors of the application instances 242 (e.g., whether contact lists are accessed, whether browsing history is accessed, and so forth), circumstances under which the application instances 242 crash (e.g., types of clients 206, types of wireless carriers, etc.), user demographics, and so on. The behavioral usage profiles 257 may incorporate synchronization history from a synchronization service. Metrics related to synchronization may be obtained from the client 206 and/or from the synchronization service.

The user lifestyle fingerprints 258 include data profiling various characteristics of particular users of the applications 103 based, for example, on data that the particular users have elected to share. The user lifestyle fingerprints 258 may record time periods (e.g., hours of the day, days of the week, etc.) during which the particular user typically uses certain types of applications 103. The user lifestyle fingerprints 258 may also record locations where the user typically uses certain types of applications 103. As a non-limiting example, a user may employ a certain type of application 103 while at the office weekdays from 8 a.m. to 5 p.m., another type of application 103 while commuting weekdays from 7:30 a.m. to 8 a.m. and 5 p.m. to 5:30 p.m., and yet another type of application 103 while at home on weekdays from 5:30 p.m. to 8 p.m. and on weekends. To this end, the user lifestyle fingerprints 258 may be developed based at least in part on the behavioral usage metrics 239 received from clients 206 associated with the particular users.

Beyond merely the types of applications 103 that are preferred, the user lifestyle fingerprints 258 may also record specific components or libraries of applications 103 that are frequently used. Such a determination may be made through comparison with the application fingerprints 106. For example, a user may prefer applications 103 that use social networking functionality, global positioning system (GPS) functionality, or a flashlight functionality.

Additionally, the user lifestyle fingerprints 258 may also profile user-specific purchasing behavior via the application marketplace system 224. For example, a user lifestyle fingerprint 258 for a given user may indicate whether the user is a frequent purchaser regardless of cost, a reluctant cost-conscious purchaser, or a frequent purchaser from within an application 103. This information may be employed by the application marketplace system 224 to target specific versions of applications 103 (e.g., low-cost versions, high-cost versions, "freemium" versions, etc.) and to market effectively to specific categories of users.

Various techniques relating to collecting behavioral usage metrics 239 from applications 103 are described in U.S. patent application Ser. No. 13/215,972 entitled "COLLECTING APPLICATION USAGE METRICS" and filed on Aug. 23, 2011, which is incorporated herein by reference in its entirety. Various techniques relating to profiling user behavior are described in U.S. patent application Ser. No. 13/555,724 entitled "BEHAVIOR BASED IDENTITY SYSTEM" and filed on Jul. 23, 2012, which is incorporated herein by reference in its entirety.

The data associated with the application marketplace 245 includes, for example, download information 269, categories 272, application usage data 275 and/or other data. The download information 269 indicates the popularity, either in terms of absolute number of downloads or in terms of relative popularity, of the applications 103 offered by the application marketplace 245. The download information 269 can also identify users, either individually by a user account and/or on an aggregate basis according to demographic category, that have downloaded a particular application 103. The categories 272 correspond to groupings of applications 103 that may indicate similar applications 103 and may be employed by users to more easily navigate the offerings of the application marketplace 245. Non-limiting examples of categories 272 may include social networking applications 103, mapping applications 103, movie information applications 103, shopping applications 103, music recognition applications 103, and so on.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display comprising, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as an application instance 242, a metric generation service 276, and/or other applications. The application instance 242 corresponds to an instance of an application 103 that has been downloaded to the client 206 from the application marketplace system 224. The application instance 242 may correspond to actual use by an end user or test use on a test client 206. The metric generation service 276 is configured to monitor the application instance 242 and report data that the user of the client 206 has elected to share with the metric collection service 218. Such data may include resource consumption metrics 236, behavioral usage metrics 236, and/or other data. The client 206 may be configured to execute applications beyond the application instance 242 and the metric generation service 276 such as, for example, browsers, mobile applications, email applications, social networking applications, and/or other applications.

Next, a general description of the operation of the various components of the networked environment 200 is provided. To begin, an application 103 is received by the computing environment 203. The fingerprint generation service 215 then begins processing the application 103 to generate an application fingerprint 106. Such initial processing may comprise a static analysis, which may compare the object code 260 and/or the source code 263 against identified software libraries or recognizable code fragments in either an exact or substantially similar form. As an example, a code fragment may correspond to a software library. As another example, a code fragment may correspond to open-source reference code for performing some function. The fingerprint generation service 215 may also perform a dynamic analysis of the application 103, which may include executing an application instance 242 for the application 103 in a hosted environment 220 and determining which code paths are taken by the object code 260.

The application fingerprint 106 may indicate which of the identified software libraries, code fragments and/or identified hardware resources are actually used by the application instance 242. Resource consumption metrics 236 and/or usage data 239 may be generated by a metric generation service 276 executed in a client 206. The resource consumption metrics 236 and/or usage data 239 then may be reported back from the client 206 to the metric collection service 218 by way of the network 209, which can analyzed and incorporated into an application fingerprint 106 as well as application usage data 275. An application fingerprint 106 can also take into account resources used by an application 103, such as include sound files, graphical assets, graphical textures, images, buttons, user interface layouts, and so on. Such application resources may include data items on clients 206, e.g., contact lists, text messages, browsing history, etc. Identifiers for such application resources may be included in a generated application fingerprint 106. It is noted that the identified device resources may include static resources and runtime resources.

Accordingly, an application fingerprint 106 that has been generated may be used in many different ways. As one example, the application improvement service can analyze an application fingerprint 106 as well as application usage data 275 to generate recommendations regarding improvements that can be made to an application 103 that is distributed via the application marketplace 245. Recommendations can be generated based upon an analysis of other applications 103 that are also distributed via the application marketplace 245 as well as their respective application fingerprints 106.

In one embodiment, the application improvement service 221 obtains a particular application 103 for the purposes of generating a recommendation regarding improvements that can be made to the application 103. The application improvement service 221 can identify features employed by the application 103 based upon an analysis of the application fingerprint 106 of the application 103. As one example, the application improvement service 221 can identify another application 103, based upon an analysis of its respective application fingerprint 106 that shares a common feature relative to the application 103. The application improvement service 221 also identify, from among other applications 103 that share a feature with the application 103, those that have features that are not common to the application 103. In other words, the application improvement service 221 identifies other applications 103 that are similar to the application 103.

For example, referring back to the example depicted in FIG. 1, the application improvement service 221 can determine, based upon an analysis of the application fingerprint 106b that the application 103b possesses at least one common feature relative to the application 103a. In the depicted example, the application 103a and 103b both employ a common software library or code fragment, which may be an indication that they share a common feature. Both applications 103a and 103b also employ a common device capability, which can also indicate a common feature. As another example, both applications 103a and 103b may result in a similar resource consumption profile with respect to one or more device resources, which can similarly indicate a common feature between the applications 103a and 103b. Additionally, both applications 103a and 103b may be categorized in the same category 272 within an application marketplace 245, which may be an indication that the applications 103a and 103b share a common feature.

In the example of FIG. 1, application 103b incorporates social networking features that are not employed by the application 103a, or a feature that is not common to both applications. Accordingly, the application improvement service 221 can also determine whether the application 103b having a feature that incorporates a feature not employed by the application 103a performs better than the application 103a with respect to one or more performance metrics. Performance metrics may be related to download, usage, profitability, revenue, ratings, popularity, controversy, speed, utilization, difficulty, resource consumption, and the like. For example, the application improvement service 221 may determine that application 103b is more popular within the application marketplace 245 than application 103a. As another example, the application improvement service 221 may determine that application 103b garners more usage than application 103a according to application usage data 275 collected by the metric collection service 218 for both applications. As yet another example, the application 103b may generate more revenue per user or total revenue (e.g., advertising revenue, application sales, etc.) than the application 103a. Another example of a performance metric is usage time of an application 103. For example, if another application 103b is associated with a higher level of usage time by users, such a scenario can be deemed as more desirable than less usage time.

Accordingly, the application improvement service 221 can generate a recommendation that can be transmitted to a developer of the application 103a to suggest that the application 103a be augmented to incorporate a feature that is present within application 103b that is identified from the analysis of their respective application fingerprints 106a and 106b. In the example shown in FIG. 1, the application improvement service 221 can recommend that the application 103a be augmented to incorporate social networking features based upon the use of the "SocialConnect 0.1a" software library by the application 103b and that is not employed by the application 103a. Additionally, the application improvement service 221 can also recommend that the application 103a be augmented to incorporate content streaming or networking capabilities based upon the use of the radio and network capabilities by the application 103b that is not employed by the application 103. In these scenarios, the application improvement service 221 can make a determination as to what feature is associated with a particular software library or code fragment based upon the name of the software library, code fragment, or device capability. In other scenarios, the application improvement service 221 can make such a determination based upon a user curated source that associates the use of one or more software library or code fragment, device capability, or any combination thereof, to an application 103 feature.

As another example, the application improvement service 221 can generate a recommendation for an improvement to the application 103b based on aspects of application 103a that can be determined based upon an analysis of its respective application fingerprint 106a. For example, the application improvement service 221 can determine an average, median, and/or mean frame rate of content rendered by the application 103a based upon usage data 239 obtained from clients 206 executing the application 103a. If the frame rate of content rendered by the application 103a is higher than that of the application 103b, the application improvement service 221 can generate a recommendation that the application 103b improve its frame rate.

As yet another example, the application improvement service 221 can determine a metric associated with user perceivable lag of an application 103a based upon usage data 239 obtained from clients 206 executing the application 103a. If the user perceivable lab metric is better than that of the application 103b, the application improvement service 221 can generate a recommendation that the application 103b improve its user perceivable lag metric.

As another example, the application improvement service 221 can also identify crash data within usage data 239 obtained from clients 206 executing the application 103a. The application improvement service 221 can also analyze a code fragment and/or device capability that causes a threshold percentage of crashes from the crash data. If a related application 103b does not exhibit similar crash behavior and employs a different but analogous software library or code fragment (e.g., a different version, an alternative library with a similar name, an alternative library providing an analogous function), the application improvement service 221 can generate a recommendation that the application 103a employ the different but analogous software library or code fragment. In some embodiments, the application improvement service 221 can simply identify the software library or code fragment associated with the threshold percentage of crashes and recommend that the application 103a employ any other software library or code fragment.

Additionally, because an initial user experience is often important for improving user engagement, sales, downloads, etc., the application improvement service 221 can determine from application usage data 275 whether an application 103 crashes upon initial execution in more than a threshold percentage of cases. If so, then the application improvement service 221 can identify another application 103 that shares a common feature but that does not crash upon initial execution in more than a threshold percentage of cases and generate a recommendation that the application 103 employ software libraries and/or features associated with the other application.

When generating a recommendation for improvements that can be made to an application 103, the application improvement service 221 can also determine whether a related application 103 is associated with a performance metric in which the related application 103 performs better than the application 103. The application improvement service 221 can also determine whether a specific feature of the other application 103 can be attributable to the other application's 103 better performance with respect to the performance metric and generate a recommendation for the application 103 that includes the specific feature. For example, if the other application 103 performs better than the application with respect to the application 103 according to a usage time performance metric, the application improvement service 221 can identify a feature that is associated with a high degree of usage time within the other application 103. The usage time performance metric can relate to an average, mean and/or median usage time and/or any other metric with respect to the usage time of an application 103 by a population of users.

If the feature associated with a high degree of usage time in the other application 103 is not present in the application 103, the application improvement service 221 can generate a recommendation that recommends the feature as an improvement. The application improvement service 221 can perform a similar analysis with respect to other performance metrics other than usage time in order to generate recommendations for improvements or additional features that can be added to an application 103.

Figure 3:
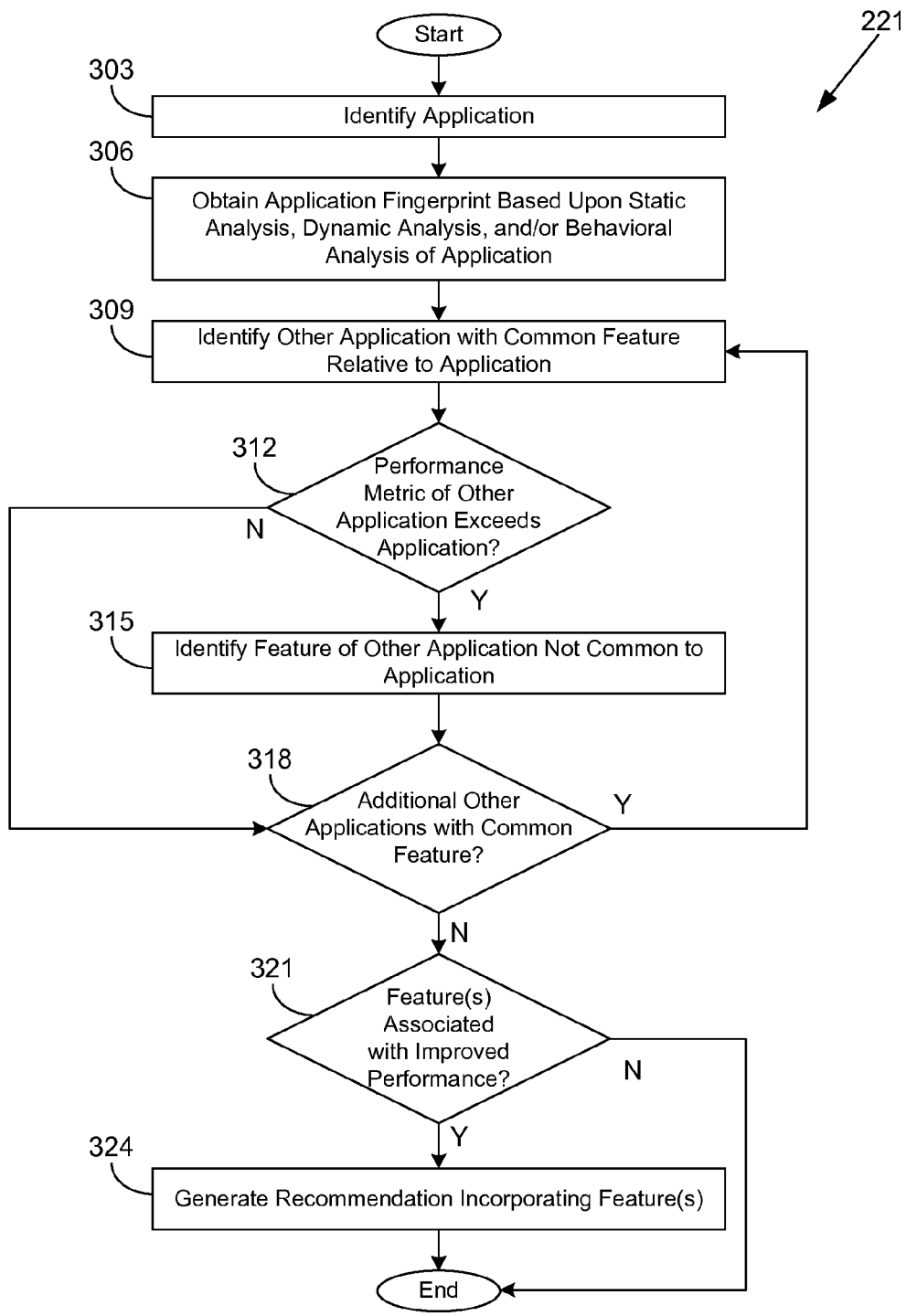
FIG. 3 is a flowchart illustrating one example of functionality implemented as portions of a fingerprint generation service executed in a computing environment in the networked environment of FIG. 2 according to various embodiments of the present disclosure.

Referring next to FIG. 3, shown is a flowchart that provides one example of the operation of a portion of the fingerprint generation service 215 according to various embodiments. It is understood that the flowchart of FIG. 3 provides merely an example of the many different types of functional arrangements that may be employed to implement the operation of the portion of the application improvement service 221 as described herein. As an alternative, the flowchart of FIG. 3 may be viewed as depicting an example of steps of a method implemented in the computing environment 203 (FIG. 2) according to one or more embodiments.

Beginning with box 303, the application improvement service 221 receives an application 103 (FIG. 1). For example, the application 103 may be uploaded or downloaded from a developer to the computing environment 203. In box 306, the application improvement service 221 (FIG. 2) can obtain an application fingerprint 106 corresponding to the application 103. In box 309, the application improvement service 221 can identify other applications that are related to the application 103. For example, the application improvement service 221 can identify other applications that share a common feature with the application 103 or that are categorized within the same category in an application marketplace 245 (FIG. 1). In box 312, the application improvement service 221 can determine whether a performance with respect to a performance metric of one of the other application 103 exceeds performance with respect to the performance metric of the application 103. If the performance of one of the other applications does not exceed that of the application 103, the process can proceed to box 318.

In box 315, if the performance metric of the other application 103 exceeds that of the application 103, the application improvement service 221 can identify a feature of the other application 103 that is not common to the application 103. In other words, the application improvement service 221 can identify features from the other application 103 that are not present in the application 103 based upon an analysis of their respective application fingerprints 106 and/or application usage data 275. In box 318, the application improvement service 221 determines whether there are additional applications 103 with a common feature with the application 103 and progresses to similarly identify features within each of the additional applications 103 that are not present in the application 103.

At box 321, the application improvement service 221 can determine whether any and/or each of the features present within the other applications 103 that are not common to the application 103 are attributable to the better performance with respect to a performance metric of the other applications 103. If so, then at box 324, the application improvement service 221 generates a recommendation that includes the features that are attributable to an improved performance with respect to the performance metric. Thereafter, the process shown in FIG. 3 proceeds to completion.

Figure 4:
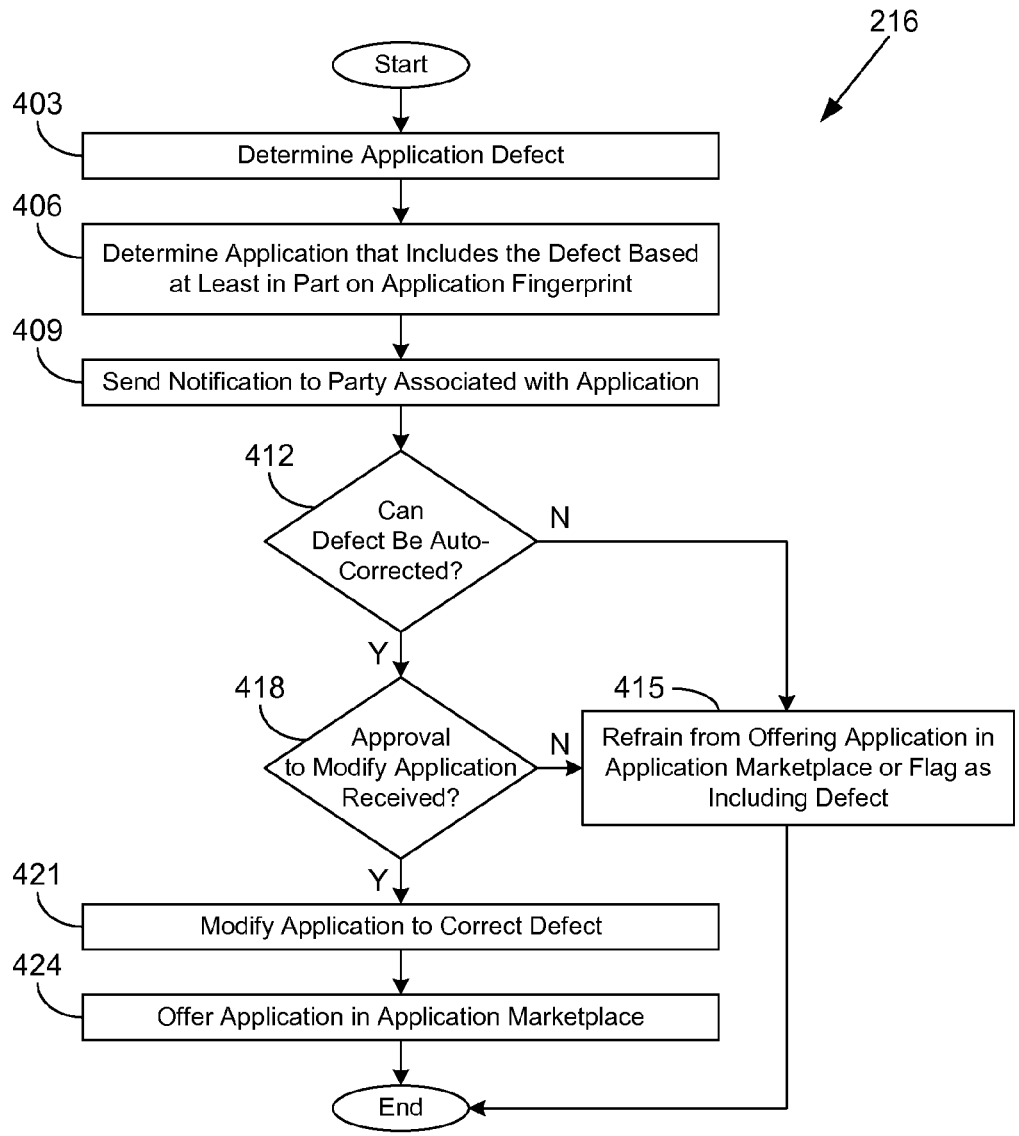
FIG. 4 is a flowchart illustrating one example of functionality implemented as portions of a fingerprint generation service executed in a computing environment in the networked environment of FIG. 2 according to various embodiments of the present disclosure.

Turning now to FIG. 4, shown is a flowchart that provides one example of the operation of a portion of the defect detection service 216 according to various embodiments. It is understood that the flowchart of FIG. 4 provides merely an example of the many different types of functional arrangements that may be employed to implement the operation of the portion of the defect detection service 216 as described herein. As an alternative, the flowchart of FIG. 4 may be viewed as depicting an example of steps of a method implemented in the computing environment 203 (FIG. 2) according to one or more embodiments.

Beginning with box 403, the defect detection service 216 determines an application defect based at least in part on the defect detection data 255 (FIG. 2). In one embodiment, the defect detection service 216 may receive external data indicating that a particular application 103 (FIG. 1) and/or identified code fragment 248 (FIG. 2) includes a defect. In another embodiment, the defect detection service 216 may receive information based on a static analysis performed by the static analysis service 227 (FIG. 2) that an application 103 or identified code fragment 248 includes a defect. In another embodiment, the defect detection service 216 may receive information based on a dynamic analysis performed by the dynamic analysis service 230 (FIG. 2) that an application 103 or identified code fragment 248 includes a defect. In another embodiment, the defect detection service 216 may receive information based at least in part on usage data such as resource consumption metrics 236 (FIG. 2) based on actual use of the application 103 at clients 206 (FIG. 2).

Such analyses may be performed as part of generating the application fingerprint 106 (FIG. 1) for the application 103. In one embodiment, where multiple applications 103 are determined to include a defect, the application fingerprints 106 of the defective applications 103 may be analyzed to determine identified code fragments 248 or other functionality in common that may be the source of the defect. The source (e.g., specific identified code fragment 248, code pattern, etc.) may then be associated with the defect in the defect detection data 255.

It is noted that defects may occur in applications 103 that are device specific. For example, an application 103 may execute normally on one particular client 206 having one configuration but may crash or otherwise present a defect on a different client 206 having a different configuration. Such device-specific problems may still be regarded as defects in various embodiments. Some defects may be associated with the use of specific application resources, such as graphical assets, media files, and so on. For example, a specific media file may be created in such a way that causes a defect to be expressed by an application 103.

In box 406, the defect detection service 216 determines one or more applications 103 that include the defect based at least in part on the application fingerprints 106 of the applications 103. For example, where a particular identified code fragment 248 includes the defect, the defect detection service 216 may perform a search upon the application fingerprints 106 to determine which applications 103 also use the identified code fragment 248. As another example, where a particular identified device resource 251 (e.g., an application resource) is associated with the defect, the defect detection service 216 may perform a search upon the application fingerprints 106 to determine which applications 103 also use the identified device resource 251. Alternatively, where a particular application 103 includes a defect, the defect detection service 216 may determine applications 103 that have similar resource consumption profiles 254 (FIG. 2) or other characteristics similar to the particular application 103 based at least in part on the corresponding application fingerprints 106. Such applications 103 may also have the same defect as the particular application 103. In response to detecting the defect, the defect detection service 216 may implement various actions as will be described. In some cases, the application 103 may be submitted for testing to confirm and/or isolate the defect.

In box 409, the defect detection service 216 may send a notification of the detected defect to a party associated with the application 103 determined to include the defect. As a non-limiting example, the party may correspond to a developer of the application 103. Alternatively, the party may correspond to a developer of a particular identified code fragment 248 that is defective. The notification may take the form of a notification in a web page, an email message, a text message, a phone call, or other form of notification.

In box 412, the defect detection service 216 determines whether the defect of the application 103 can be automatically corrected via a modification to the application 103. If the defect cannot be automatically corrected, the defect detection service 216 proceeds to box 415 and configures the application marketplace system 224 (FIG. 2) to refrain from offering the application 103 in the application marketplace, or to flag the application 103 as including a potential defect by associating the application 103 with a defect indicator. Thereafter, the portion of the defect detection service 216 ends.

If, instead, the defect can be automatically corrected, the defect detection service 216 may continue from box 412 to box 418 and determine whether approval to modify the application 103 has been received from the notified party. If approval is necessary and has not been received, the defect detection service 216 moves from box 418 to box 415 and configures the application marketplace system 224 to refrain from offering the application 103 in the application marketplace, or to flag the application 103 as including a potential defect. Thereafter, the portion of the defect detection service 216 ends.

If, instead, approval to modify the application 103 is received, or if approval is not necessary, the defect detection service 216 transitions from box 418 to box 421 and modifies the application 103 to correct the defect. To this end, the defect detection service 216 may invoke the defect correction service 217 to perform the defect correction. The defect correction service 217 may replace a code fragment 248 with an alternative code fragment 248, replace a defective version of a code fragment 248 with a non-defective version of the code fragment 248 (which may be an updated version or an older version, as the case may be), modify object code 260 (FIG. 2) of the application 103, modify source code 263 (FIG. 2) and recompile the application 103, modify metadata 266 (FIG. 2) of the application 103, or perform other modification tasks.

Fixes such as alternative code fragments 248 may be determined based at least in part on application fingerprints 106. For example, where a global positioning service (GPS) library is defective, the defect correction service 217 may search for applications 103 using GPS functionality and then determine different libraries or updated versions of the defective library that do not include the defect. In one embodiment, perhaps either in conjunction with correcting the defect or not correcting the defect, the defect correction service 217 may instrument the application 103 to include logging functionality relative to the detected defect. For example, the application 103 may be instrumented to collect information relative to a particular call, such as a system call, method call, library call, procedure call, or other call. Information collected via such logging functionality may be employed to manually or automatically correct the defect.

In box 424, the defect detection service 216 configures the application marketplace system 224 to offer, or continue offering, the application 103 in the application marketplace. Where an application 103 previously had been flagged as including the defect, such a flag may be removed. In some cases, customers or potential customers may be notified of the corrected defect and availability of the updated version of the application 103. Thereafter, the portion of the defect detection service 216 ends.

Figure 5:
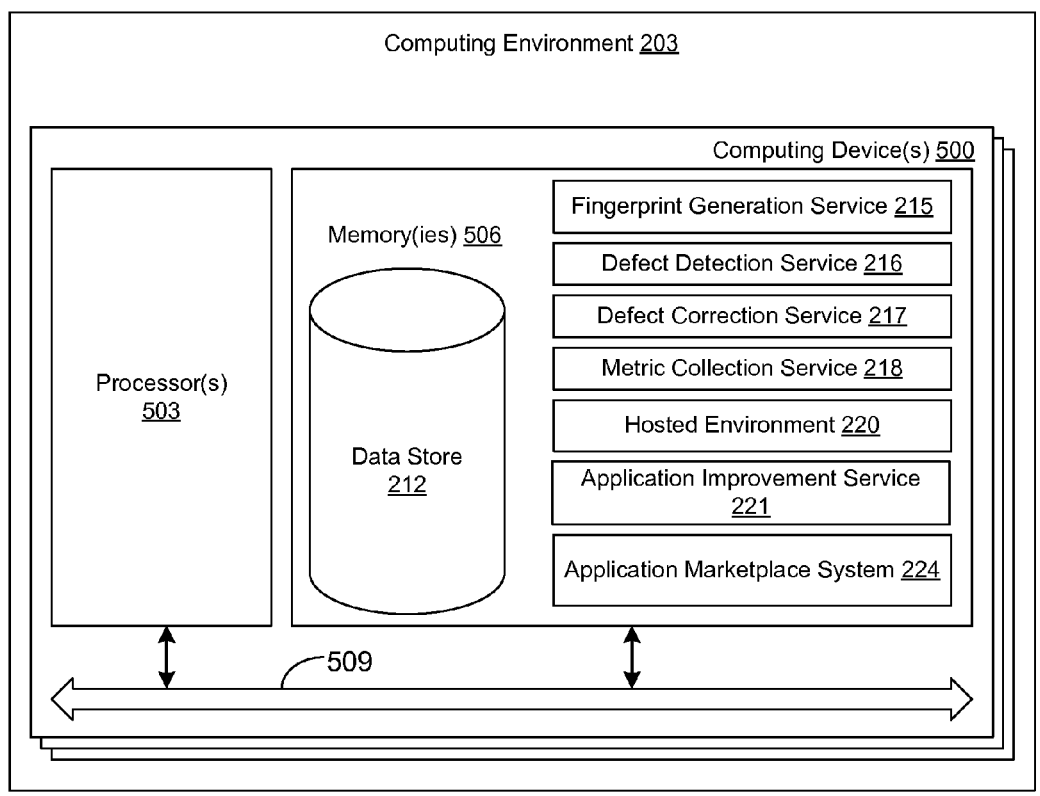
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the fingerprint generation service 215, the defect detection service 216, the defect correction service 217, the metric collection service 218, the hosted environment 220, application improvement service 221, the application marketplace system 224, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the fingerprint generation service 215, the defect detection service 216, the defect correction service 217, the metric collection service 218, the hosted environment 220, application improvement service 221, the application marketplace system 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the fingerprint generation service 215 and the defect detection service 216. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the fingerprint generation service 215, the defect detection service 216, the defect correction service 217, the metric collection service 218, the hosted environment 220, application improvement service 221 and the application marketplace system 224, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a computer-executable program stored thereon that, when executed by at least one computing device, configures the at least one computing device to perform operations comprising:
  identifying an application in an application marketplace;
  executing an instance of the application;
  performing, in response to executing the instance, an analysis of a set of code fragments employed by the instance;
  performing, in response to executing the instance, an analysis of a set of device resources employed by the instance;
  determining a resource consumption profile employed by the application based at least in part upon the analysis of the set of code fragments and the analysis of the set of device resources;
  generating an application fingerprint based at least in part upon the analysis of the set of code fragments, the analysis of the set of device resources, and the resource consumption profile, the application fingerprint comprising information about the set of code fragments, the set of device resources, and the resource consumption profile;
  executing at least one other instance of at least one other application;
  generating at least one other application fingerprint based at least in part upon an analysis of at least one other resource consumption profile employed by the at least one other application;
  identifying at least one improvement to the application based at least in part upon an analysis of the application fingerprint by comparing a performance metric in the application fingerprint to a corresponding performance metric in the at least one other application fingerprint;
  determining that a specific feature is attributable to the corresponding performance metric;
  generating a recommendation associated with the at least one improvement, wherein the recommendation comprises incorporating the specific feature that is attributable to the corresponding performance metric into the application; and
  incorporating the specific feature that is attributable to the corresponding metric into the application by modifying a code fragment of the application.

2. The non-transitory computer-readable medium of claim 1, wherein the application fingerprint is generated based at least in part upon usage data corresponding to usage of the application by a plurality of users associated with the application marketplace.

3. The non-transitory computer-readable medium of claim 1, wherein the application fingerprint is generated based at least in part upon crash data associated with the application.

4. The non-transitory computer-readable medium of claim 1, wherein the corresponding performance metric in the at least one other application indicates a better performance than the performance metric in the application.

5. The non-transitory computer-readable medium of claim 1, wherein modifying the code fragment of the application comprises replacing the code fragment with another code fragment.

6. A system, comprising:
  at least one computing device; and
  at least one service executable in the at least one computing device, the at least one service configured to cause the at least one computing device to:
    execute an instance of an application;
    perform, in response to executing the instance, an analysis of a set of code fragments employed an application and an analysis of a set of device resources employed by the instance;
    obtain an application fingerprint for the application, the application fingerprint based at least in part upon the analysis of the set of code fragments employed by the instance and the analysis of the set of device resources employed by the instance;
    execute at least one other instance of at least one other application;
    obtain at least one other application fingerprint based at least in part upon an analysis of at least one other set of code fragments employed by the at least one other application and an analysis of at least one other set of device resources employed by the at least one other application;
    perform an analysis of the application fingerprint of the application to identify at least one improvement to the application based at least in part upon the analysis of the application fingerprint by comparing a performance metric in the application fingerprint to a corresponding performance metric in the at least one other application fingerprint associated with the at least one other application;
    determine that a specific feature is attributable to the corresponding performance metric;
    generate a recommendation for the at least one improvement to the application, wherein the recommendation comprises incorporating the specific feature that is attributable to the corresponding performance metric into the application; and
    incorporate the specific feature that is attributable to the corresponding performance metric into the application by modifying a code fragment of the application.

7. The system of claim 6, wherein the performance metric comprises at least one of: application sales data, a number of application downloads, or advertising revenue data.

8. The system of claim 6, wherein the performance metric comprises a video frame rate associated with respective video rendered by the application and the at least one other application.

9. The system of claim 6, wherein the performance metric comprises an average usage time associated with the application and the at least one other application by a plurality of users associated with an application marketplace.

10. The system of claim 6, wherein the performance metric comprises a user perceivable lag metric associated with the application and the at least one other application.

11. The system of claim 6, wherein the specific feature comprises at least one of: a social networking component or a location-based component.

12. The system of claim 6, wherein the at least one service that causes the at least one computing device to generate the recommendation for the at least one improvement further causes the at least one computing device to determine whether a usage rate of the specific feature meets a predefined threshold.

13. The system of claim 6, wherein the at least one service that causes the at least one computing device to generate the recommendation for the at least one improvement further causes the at least one computing device to:
obtain usage data associated with execution of the application by a plurality of users of an application marketplace; and
identify the at least one improvement based at least in part upon the usage data.

14. The system of claim 13, wherein the at least one service that causes the at least one computing device to identify the at least one improvement based at least in part upon the usage data further causes the at least one computing device to:
identify crash data in the usage data;
identify a code fragment associated with at least a threshold percentage of crashes reflected by the crash data;
determine whether the at least one other application employs the code fragment associated with the at least a threshold percentage; and
wherein the at least one improvement comprises a recommendation based at least in part upon the code fragment associated with the at least a threshold percentage.

15. The system of claim 13, wherein the at least one service that causes the at least one computing device to identify the at least one improvement based at least in part upon the usage data further causes the at least one computing device to:
identify whether the application crashed in an initial execution in more than a threshold amount of initial executions reflected by the usage data;
identify a code fragment associated with at least a threshold percentage of crashes reflected by crash data;
determine whether another application having at least one feature in common to the application employs the code fragment associated with the at least a threshold percentage; and
wherein the at least one improvement comprises a recommendation based at least in part upon the code fragment associated with the at least a threshold percentage.

16. A method, comprising:
executing, via at least one computing device, an instance of an application;
performing, via the at least one computing device, in response to executing the instance, an analysis of a set of code fragments employed by the instance;
obtaining, via the at least one computing device, an application fingerprint associated with the application based at least in part upon the analysis of the set of code fragments employed by the application, the application fingerprint encoding respective identifiers for the set of code fragments employed by the application;
determining, via the at least one computing device, that the application includes a defect based at least in part on an analysis of the application fingerprint, wherein the analysis of the application fingerprint comprises comparing a performance metric in the application fingerprint to a corresponding performance metric in at least one other application fingerprint associated with another application; and
implementing, via the at least one computing device, an improvement to the application in response to determining that the application includes the defect, wherein implementing the improvement comprises modifying a code fragment of the application.

17. The method of claim 16, further comprising offering, via the at least one computing device, the application in an application marketplace in response to determining that the defect has been corrected.

18. The method of claim 16, wherein the application fingerprint further encodes respective identifiers of a set of application resources employed by the application, and the method further comprises:
determining, via the at least one computing device, at least one of the set of application resources or the set of code fragments based at least in part on the application fingerprint; and
determining, via the at least one computing device, whether the set of application resources or the set of code fragments are associated with the defect.

19. The method of claim 18, further comprising:
determining, via the at least one computing device, that a plurality of other applications are associated with the defect based at least in part on usage data corresponding to the other application;
identifying, via the at least one computing device, a code fragment employed by the other applications based at least in part on a plurality of application fingerprints corresponding to the other applications; and
associating, via the at least one computing device, the code fragment with the defect.

20. The method of claim 16, wherein the improvement comprises at least one of: instrumenting the application to facilitate logging relative to a call, sending a notification of the defect to a party associated with the application, refraining from offering the application in an application marketplace or associating a defect indicator with the application in an application marketplace.

21. The method of claim 16, wherein the improvement comprises at least one of modifying object code of the application or modifying source code of the application.

22. The method of claim 16, wherein the improvement further comprises replacing the code fragment of the application with a second code fragment.

23. The method of claim 22, wherein the second code fragment corresponds to a non-defective version of the first code fragment.

24. The method of claim 16, further comprising flagging, via the at least one computing device, the application in an application marketplace by associating the application with a defect indicator.

* * * * *